(12) United States Patent
Schmidt

(10) Patent No.: US 6,213,751 B1
(45) Date of Patent: Apr. 10, 2001

(54) KNEADING DISK FOR BAKER'S MACHINERY

(75) Inventor: Karl Heinz Schmidt, Hardegsen (DE)

(73) Assignee: Karodur-Wirkteller GmbH, Troisdorf (DE)

( * ) Notice: Subject to any disclaimer, the term of this patent is extended or adjusted under 35 U.S.C. 154(b) by 0 days.

(21) Appl. No.: 09/446,748

(22) PCT Filed: Apr. 30, 1998

(86) PCT No.: PCT/EP98/02561

§ 371 Date: Dec. 28, 1999

§ 102(e) Date: Dec. 28, 1999

(87) PCT Pub. No.: WO99/01036

PCT Pub. Date: Jan. 14, 1999

(30) Foreign Application Priority Data

Jul. 2, 1997 (DE) .......................................... 297 11 529 U
Jul. 2, 1997 (DE) .......................................... 297 11 528 U

(51) Int. Cl.[7] ................. A21C 3/10; A21C 5/08; A23L 1/00
(52) U.S. Cl. ................. 425/185; 99/353; 425/186; 425/189; 425/297; 425/298; 425/332
(58) Field of Search ................. 99/353, 494, 485, 99/450.1–450.8; 100/268; 425/185, 186, 189, 297, 298, 332, 190, 196, 311, 94, 194, 306, 193, 206, 300, 403, 135, 162

(56) References Cited

U.S. PATENT DOCUMENTS

| | | | |
|---|---|---|---|
| 1,150,655 | * | 8/1915 | Bertram ................. 425/206 |
| 1,352,424 | * | 9/1920 | Abrams et al. ................. 425/300 |
| 1,954,443 | * | 4/1934 | Doolin ................. 425/190 |
| 2,094,289 | * | 9/1937 | Blum et al. ................. 425/135 |
| 3,521,578 | * | 7/1970 | Fraioli, Sr. ................. 425/94 |
| 4,898,528 | * | 2/1990 | Willard et al. ................. 425/185 |
| 4,950,147 | * | 8/1990 | Willard et al. ................. 425/185 |
| 4,984,978 | * | 1/1991 | Beatty ................. 425/185 |

FOREIGN PATENT DOCUMENTS

| | | |
|---|---|---|
| 3529671 C1 | 7/1986 | (DE) . |
| 2230999 | 11/1990 | (GB) . |

* cited by examiner

Primary Examiner—Timothy F. Simone
(74) Attorney, Agent, or Firm—Synnestvedt & Lechner LLP

(57) ABSTRACT

A forming plate for a bakery machine is provided having a working surface area on an upper side with an array of forming bowls provided concentrically in circles thereon. The bowls each have a system of concentric annular edges beginning at an outside and extending to a center. From each annular edge there extends, in the direction towards the center, an annular flank oriented perpendicular to the underside of the forming plate. This flank is divided into two sequential annular ramp sections via an intermediate transition zone. The annular ramp section which extends from the annular edge viewed in the direction away from the center has an angle of inclination ($\alpha_1$) which is greater than the angle of inclination ($\alpha_2$) of the immediately following annular ramp section. This achieves an acute-angled, knife-like shaping of the ramp sections which follow on from the annular edge, as well as from a considerable height of the annular edge above the flank base. There is thus an improved penetration of the annular edges into the dough which is being handled by the forming plate, and the ability to handle on this forming plate even comparatively dry dough which would otherwise be difficult to handle.

15 Claims, 8 Drawing Sheets

KNEADING DISK FOR BAKER'S MACHINERY

FIELD OF THE INVENTION

The invention relates to a forming plate for a bakery machine for shaping and portioning of dough, and especially to forming plates having forming bowls on working surface areas of the forming plate.

BACKGROUND OF THE INVENTION

Forming plates are known for example from German Patent Number DE 35 29 671 C1 and are used in star-shaped knife dough-portioning and dough-forming machines for the portioning and/or shaping of dough, particularly for the forming of dough into rounds. The forming plates have a plate-like shape, one side of which is intended and designed for the portioning and forming of the dough, the other side of which is only for portioning of the dough. The first-mentioned side is provided within a circular working surface area with a regular array of forming bowls, whereas the working surface area of the other side, which lies opposite the first-mentioned side, is smooth. Along a circle, which is concentric to the working surface area, there is a series of radially extending grooves distributed uniformly around the circumference. Such grooves may be found on both sides of the forming plate. These grooves fulfil a number of purposes. They mark, in the plane of the forming plate, the working surface area, namely the zone on which dough is to be uniformly deposited for the formation of rounds or dough portions of defined mass. They also constitute venting grooves which prevent the formation of air pockets and the consequential irregular mass distribution of the dough within the chamber which receives the dough.

Depending upon the prevailing light conditions, and also upon the degree of contamination of the aforesaid grooves, in which under certain circumstances residual dough can remain, the marking function of the groove arrangement can be impaired. Depositing dough on the forming plate in an area which is not matched to the working surface area has the consequence that the round forms or dough portions which are made have too small a mass and for this reason cannot be used. The marking of the working surface area for the dough portioning process is of particular importance.

In order to carry out a forming process, the forming plate which is fixed to the forming table of a bakery machine has a defined quantity of dough deposited on its upper surface within its working surface area. This quantity of dough is then divided into portions by means of a knife arrangement which defines respective portioning chambers, and by circular motion of the forming plate, which is carried out within its plane. Each dough portion is subjected to a rounding process which involves a rolling of the dough portion against the adjacent walls of the knife arrangement so that finally a ball-shaped product is created. Each portioning chamber has a forming bowl associated therewith, and, based upon the inside profiling of the forming bowl, during the circulating movement of the forming plate there is an entraining effect exerted on the respective dough portions which are located within the portioning chambers.

These portioning chambers are generally made the same size, so that the formation of products of the same size and shape will be achieved. However, since the radius of the circular movement of the forming plate is the same for all portioning chambers, geometrically caused differences adversely affect the entrainment effect exerted by the forming bowls on the portions of dough. This leads to qualitatively different end products, depending upon the position of the respective portioning chambers. This effect will be described in more detail hereinafter with reference to the drawings.

The forming bowls customarily have a profiling of the type comprising a plurality of step-wise successive and concentric annular edges. In order to be able to exert an entraining effect on the dough portions within the portioning chambers, wherein the dough skin is drawn towards the inside by the cutting edges of the portioning chambers, a penetration of the annular edge profiles into the substance of the dough is necessary. If this penetration is insufficient, the entraining effect exerted on the dough is correspondingly reduced. The definitive shaping of the annular edge profile is made more difficult, among other things, by virtue of the fact that the dough cut up in the portioning chambers by the portioning process is initially extraordinarily sticky in the region of the cutting edges, especially with soft dough. Therefore the dough tends to remain in any appropriately dimensioned recesses, grooves or the like. This property of the dough makes it necessary to avoid sharp edges or acutely angled profile shapes when designing the aforesaid profilings, and to make these comparatively flat. However, this again reduces the usefulness of the forming plate in handling relatively dry, kneaded dough, since the ability of flat, blunt profilings to penetrate into this type of dough is correspondingly reduced. Thus the entraining effect exerted on the dough within the framework of the forming process is made worse.

SUMMARY AND OBJECTS OF THE INVENTION

It is the object of the invention to provide a forming plate in which the visibility of the working surface area is improved, the forming plate including a plate-like base member having an upper and a lower surface, each having a working surface area for the handling of dough, and particularly for the shaping and portioning of dough. The working surface area on the upper surface is intended for shaping the dough and is provided with an array of forming bowls. The opposite working surface area on the lower surface is smooth. Both the upper and lower surface are arranged in register with one another. This object is achieved, with such a forming plate, by the position and size of the working surface areas, particularly on the smooth under surface which are made visible and defined by optical marking elements based upon localized differences in the light permeability of the base member of the forming plate.

This brings with it the advantage that, because of the markings, no changes of any type need to be made to the surfaces of the parts of the forming plate which come into direct contact with the goods to be handled, here the dough. This also brings with it the advantage that the function and the arrangement of the marking elements are not impaired with the passage of time, since the function can be realized technically in such a manner that negative effects on the utility of the marking elements as a consequence of the use of the forming plate are excluded. An unambiguous and clearly visible marking of the working surface areas makes possible a rational mode of working with the forming plate, particularly a proper deposition on it for the purpose of carrying out for example a dough portioning process. Basically, any methods can be used in order to prepare localised differences in the light permeability of the base member of the forming plate intended for carrying out a marking function.

One possibility of providing for locally different light permeability properties is to form the base member, perpendicular to its plane, of a plurality of contiguous layers connected to each other. At least one inner layer is optically opaque and the outer layers on each side of the inner layer are at least optically translucent. The base member of the forming plate may comprise, for example, a layered structure, wherein three contiguous layers are provided, of which one, namely a middle layer, is impermeable to light, so that in dependence upon its surface area shape the aforesaid marking function can be carried out. It is important in this connection that the two outer layers are each light permeable, at least translucent, so that a sufficient optical contrast effect can be achieved with the middle, light impermeable layer.

Preferably the optically opaque layer which carries the array of forming bowls, is arranged, starting from the upper surface, in a thickness zone which corresponds to the depth of the forming bowls. This brings about the advantage that the aforesaid marking function stems directly from the disposition of the forming bowls, which are arranged distributed uniformly within the working surface area. The radially outermost edges of the forming bowls must be located within the region surrounded by the dough-surrounding ring of a star cutter dough-portioning and forming machine, so that the area of the working surface can be identified by the position of the radially outer forming bowls. Because the forming bowls, starting from the flat upper surface of the forming plate, have a defined maximum depth, the light impermeable layer is arranged within the thickness zone of the forming plate which corresponds to the depth of the forming bowls. This provides the advantage of a placement close to the upper surface, and means that the light permeable layer is interrupted in the region of the forming bowls. The contours of the forming bowls are visible, so that from the positioning of these interruptions, which optically define the contours of the forming bowls, the position of the working surface area can be identified. This type of arrangement of the marking elements can be carried out extremely simply from the technical manufacturing point of view.

Preferably the layers comprise a plastic material, such as PVC, PE or PP. These plastic materials can be made at least optically translucent or optically opaque by suitable conditioning and also make possible a comparatively simple laminar construction, which can be carried out by a thermal pressing process of the layers in which there is a surface-to-surface welding of the layers together. However, in an equivalent way, basically any extruding or rolling process can be used, but a thermal pressing process gives the advantage of a homogeneous surface quality.

The preparation of the forming bowls by a localised removal of material, particularly a cutting process, is known with conventional forming plates. While this process is used for a forming plate whose light impermeable layer is placed within a thickness zone corresponding to the depth of the forming bowls in accordance with the invention, the markings carrier is in practice manufactured together with the forming bowls in one working process.

The forming plate can additionally be provided in a manner known with an arrangement of venting grooves in the working surface areas of the upper and/or lower surfaces, the grooves extending radially or at an angle to a radius line of the working surface areas.

It will be appreciated from the above description that the forming plate in accordance with the invention constitutes an improved working tool which contributes to an avoidance of faulty placing of the dough to be treated on the forming plate and the avoidance of the added work or loss in time occasioned thereby.

It is also the object of the invention to enlarge the scope of a forming plate for a bakery machine comprising a plate-like base member according to the invention in respect of achieving uniformity of the resulting products as well as a broadening of its use with any type of dough to be handled by a rounding process. As described above, the forming plate according to the invention has upper and lower surfaces, each having a working surface area for the handling, and particularly the shaping of dough. The working surface areas on the upper surface are intended for the shaping of the dough and are provided with an array of forming bowls. The opposite working surface area on the lower surface is preferably smooth. Both the upper and lower working areas preferably have the same size and are arranged to be in register with one another. Additionally, each forming bowl comprises an arrangement of concentric annular edges which follow sequentially in step-wise manner from an outside to a central bottom of the forming bowl. At each annular edge there is an annular flank extending perpendicular or substantially perpendicular to the plane of the upper surface of the forming plate and a ramp surface which falls away in a direction towards te outside.

The above noted object is achieved for the forming plate thus described by increasing the angle of inclination of a ramp surface in the region of the annular edge for an unchanged pitch spacing between two adjacent annular edges, the increased angle of inclination being compared with an initial value at the flank base, according to which the height of the annular edge relative to the flank base is increased and the annular edge has a knife-like sharp-angled profile in cross-section.

It is important that the angle of inclination of the ramp surfaces, particularly the annular flank extending perpendicular to the plane of the forming plate, does not have a constant value which would lead to a blunt cross-sectional profile in the region of the annular edge in view of the prevailing geometrical conditions. This is a departure from the relevant state of the art. In accordance with the invention, the angle of inclination is dimensioned so that, starting from a flank base it increases in the direction towards the annular edge and reaches a maximum in the region of the annular edge. This dimensioning of the angle of inclination leads to an increased height of the annular edge relative to the flank base and to a sharply angled, knife-type cross-sectional profile of the annular edge, with an otherwise unchanged pitch distance between two annular edges. This dimensioning again has the consequence that the ability of the annular edges to penetrate into the dough and—associated with this—the entraining capacity exertable by the annular edges on the dough during the shaping and rounding process is significantly improved. In comparison with the prior art, there results from this dimensioning a deeper profile between two annular edges. However, there remains a rounded transition zone between the flank base and the annular flank following on from this dimensioning, so that in spite of the deeper profile a sticking of residual dough in this region is not to be feared.

Overall, there is an improvement in the suitability of the forming plate to handle even relatively dry, kneaded dough, whose handling would otherwise be difficult with conventional forming plates. It is known that by the rounding process the skin of the dough product is drawn in towards the inside by the cutting edges. As a result of the rolling movement of the dough product against the walls of the cutter elements of the cutter array of the bakery machine, resulting from the circular motion of the forming plate, a ball-shaped dough product results. This process is decisive in terms of the capacity of the forming bowl profile to penetrate into the dough substance and in terms of the entraining effect which can be exerted on the dough. The course of the angle of inclination, starting from the flank base and going towards the aforesaid annular edge, can, for the rest, be designed to have basically any shape—so long as there is a general increase in the angle from the flank base toward the annular edge. The course of the angle can, for example, be fixed after establishment of the facts. According to the invention there results a profiling of the forming bowl which is sufficiently open so that a collection or sticking of residual dough is prevented even with soft, relatively wet and sticky dough. Nevertheless, the profiling has a sufficient capacity for penetration into the dough and is consequently suitable for exerting an entraining effect even with hard dry dough. The latter property is obtained in particular by the shaping of the annular edges.

The invention contemplates different variations of the flank angle as described below. In one embodiment the ramp surfaces are composed of at least two successive ramp sections in going from the flank base to the associated annular edge. Each ramp section has a constant angle of inclination and the angles of inclination of two successive ramp sections are respectively dimensioned so that the angle of inclination of the ramp section adjacent to the annular edge is greater than the angle of inclination of the flank section which follows it in the direction toward the flank base. Preferably the angle of inclination of the ramp surface has a steadily increasing value going from the flank base up to the associated annular edge. The angle of inclination increases steadily starting from the flank base out to the annular edge in accordance with a predetermined function. The flank angle is such that its steady course is approximated by discrete individual sections, wherein, within each section, the angle of inclination has a constant course. In the simplest case, the latter embodiment can be such that the ramp surface is composed of two sections, thus with two different angles of inclination, wherein, in accordance with the observations given above, the angle of inclination of the section which is adjacent to the annular edge is the larger. In this way, a steady flank angle course can be more closely approximated by a more extensive division into individual sections which are linear in cross-section.

By the cutter-type formation of the annular edge profile one achieves an increased capacity for penetration even with relatively dry types of dough which are otherwise comparatively difficult to handle.

The distribution of the forming bowls of a forming plate—viewed in its plane—is determined by the geometrical parameters of the cutter elements of the cutter array of a dough portioning and forming machine. Each portioning chamber of the cutter array has an associated forming bowl. The portioning chambers of the cutter array are each made the same size with a view to the production of ball-shaped dough products of the same mass. The peripheral walls of these portioning chambers are, in part, flat surfaces orientated radially and, in part, cylindrical surfaces orientated in the peripheral direction.

On geometrical grounds, there are however significant shape differences between the bottom surfaces of the radially inner portioning chambers and those of the radially outer portioning chambers. Furthermore, during the shaping and rounding process the forming bowls are each moved through a circle of the same radius established by the circular displacement of the whole forming plate. In spite of the unitary motion circle of all forming bowls and in spite of the different bottom surface geometries of the radially inner and of the radially outer portioning chambers, it is possible to ensure that the shaping of the dough portions produced as a result of the circular movement of the forming bowls is comparable for all portioning chambers. Two alternate embodiments are feasible to achieve this end. In the first embodiment, the bowl volume of all forming bowls is the same, but the diameters of the forming bowls are different, the diameters of the forming bowls associated with the radially inner dough portions being greater than the diameters of the forming bowls associated with the radially outer dough portions. In the second embodiment, the bowl volumes and diameters of all forming bowls are the same, but the angles of inclination of the forming bowls associated with the radially inner dough portions are greater than the angles of inclination of the forming bowls associated with the radially outer dough portions. Consequently, the heights of the annular edges of the radially inner forming bowls are greater than the heights of the annular edges of the radially outer forming bowls.

The alternative constructional features used for achieving comparable shaping of dough portions are directed towards making the entraining capability of the radially outer and of the radially inner forming bowls different such that the entraining capacity is increased for the radially inner forming bowls. This is advantageous since the bottom surfaces of the radially inner portioning chambers generally have a shape which is triangular overall. This increase in the entraining ability can be achieved by the first embodiment for example, if all forming bowls have the same bowl volume but the diameters of the radially inner forming bowls are made greater than the diameters of the radially outer forming bowls. This results in forming bowls which are flat in the radially inner zone and relatively deeper in the radially outer zone. The forming bowls which have the greater diameter sweep over a greater surface area during the circular movement of the forming plate. It is true that a smaller surface area is encompassed by the relatively deeper forming bowls, but in comparison to the radially inner forming bowls an increased entraining effect on the dough portions to be handled can be expected.

The actual size increase in the diameter of the bowls in the radially inner zone in comparison with the bowls in the radially outer zone is established in practice according to a compromise whereby, for a given radius of the circular movement of the forming plate and for a given working time, the actions of the forming bowls should lead to the same results both for products which are in the radially outer zone and also those in the radially inner zone. An impaired entraining effect can be compensated for by an increased working time, although a so-called overworking, in the same way as an insufficient working, must be avoided.

In the other alternate embodiment, with equal bowl volumes and equal bowl diameters, the object again is to make the entraining capability of the radially outer and of the radially inner forming bowls different. This is accomplished by making the penetrability into the dough different by the dimensioning the angle of inclination of the forming bowls, so that after a fixed working time one obtains the same end result both at the inside and at the outside. The main aim of the last-mentioned variant is consequently again the localised matched variation of the entrainability that can be exerted on the dough.

In the forming plate of the present invention one thus has a working tool which is improved in respect of its capacity to handle difficult types of dough and in respect of the uniformity of the resulting products from the radially inner and from the radially outer forming bowls.

The invention will now be described in more detail with reference to the embodiments shown in the drawings.

DETAILED DESCRIPTION OF THE PREFERRED EMBODIMENTS

In order to illustrate the method of operation of a bakery machine and star knife dough portioning and forming machine for dough portioning and shaping, here to produce round products, reference will be made first of all to FIGS. 1 and 2 of the drawings.

Figure 1:
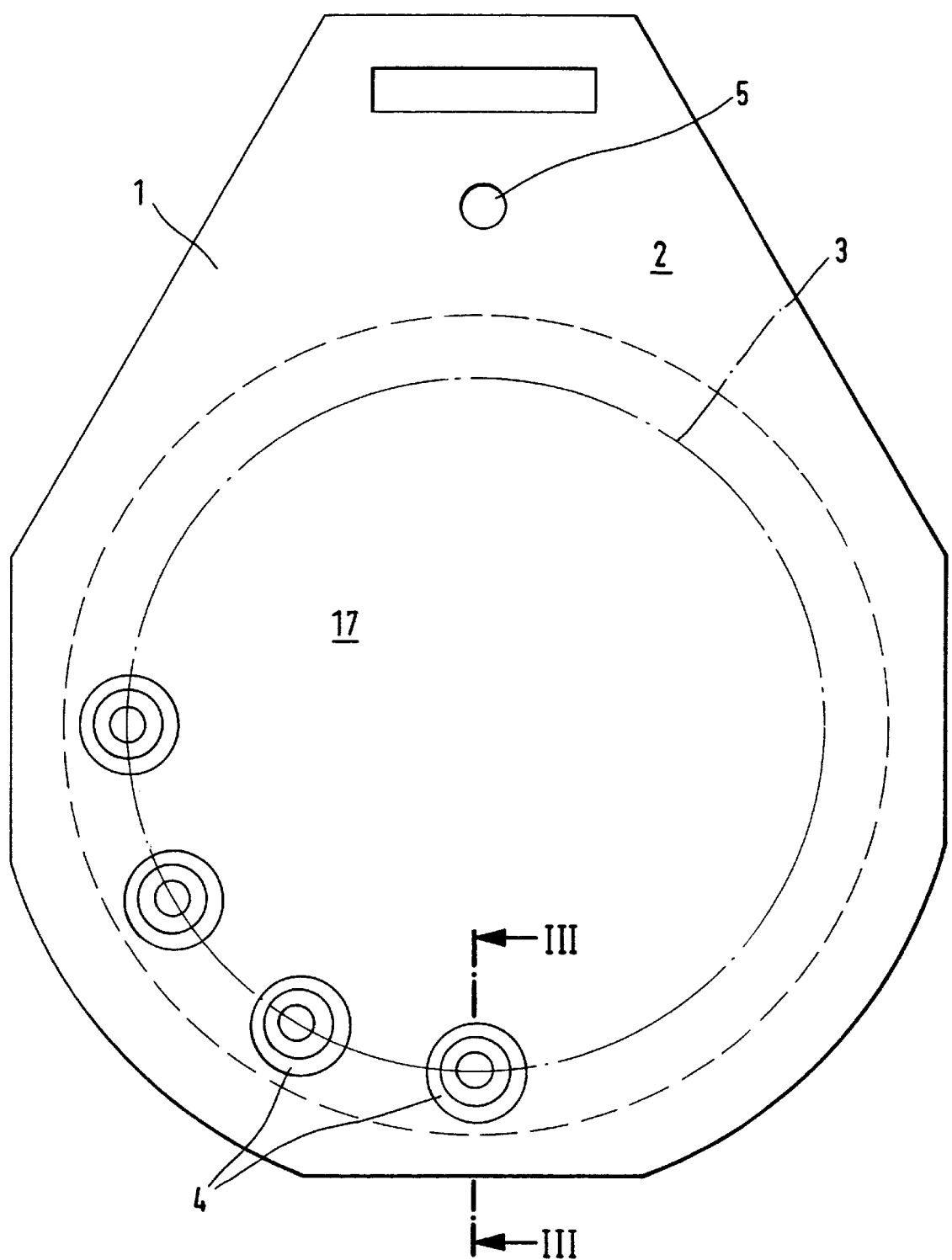
FIG. 1 is a plan view of the upper surface of a forming plate in accordance with the invention.

Reference numeral 1 in FIG. 1 indicates the forming plate in its totality. It has a generally flat shape and is provided in its upper surface 2 with an array of individual forming bowls 4 arranged on a plurality of concentric pitch circles 3.

The totality of the forming bowls 4 determines the functional surface area and working surface area of the forming plate 1, as will be described in greater detail hereinafter.

Figure 2:
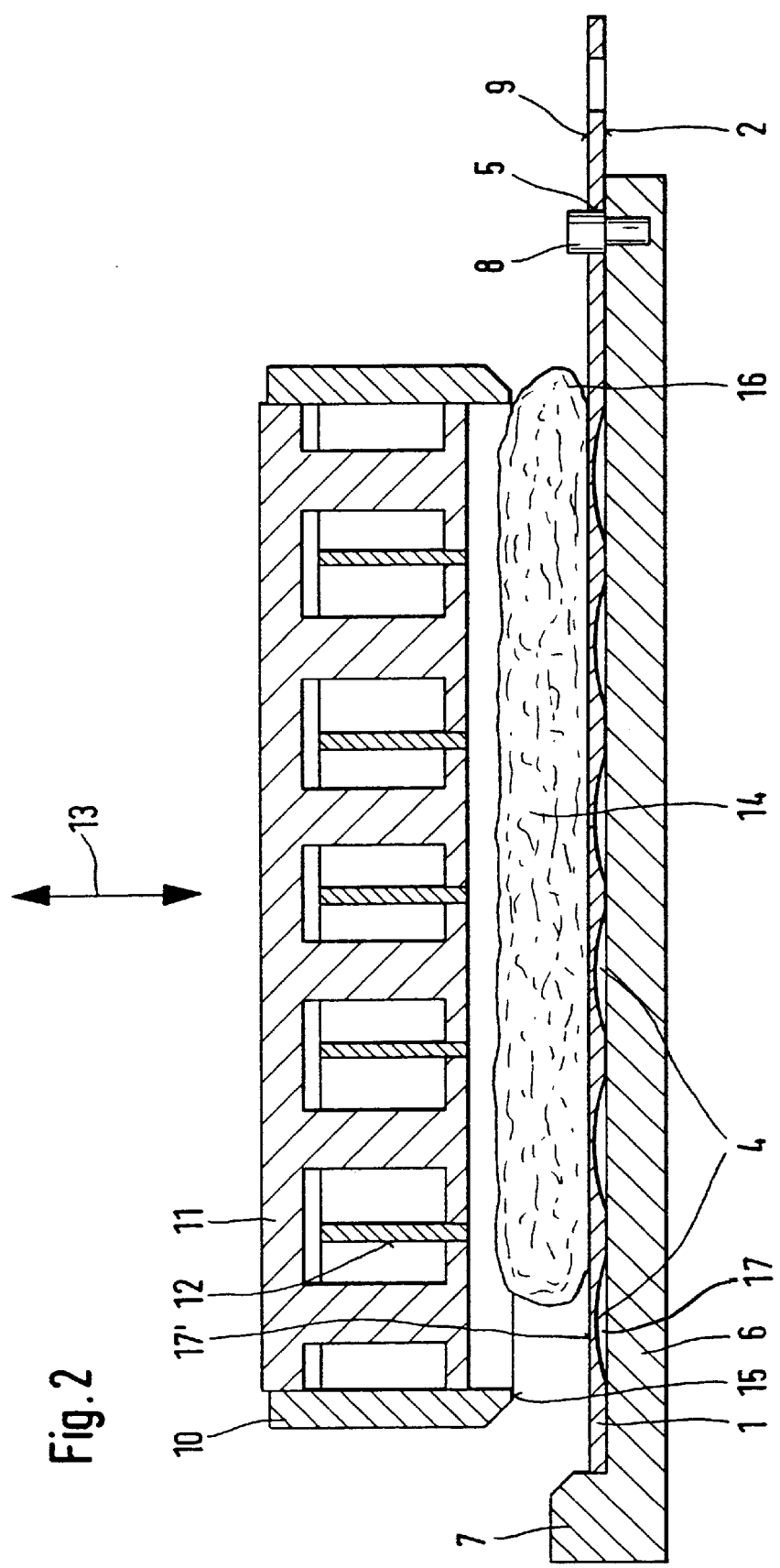
FIG. 2 is a view, partly in section, of a star knife dough-portioning and forming machine with forming plate set in place, wherein the operational elements intended for the shaping and portioning of the dough are shown in a retracted position.

At 5 is indicated a bore which is outside the aforesaid functional surface area and by means of which the forming plate 1 is fixed within the bakery machine in its working position in which it rests on a forming table 6 (see FIG. 2). For this purpose the forming table 6 is provided with a stop 7. The forming plate 1 is held fast unambiguously by means of a retaining pin 8 which penetrates through the bore 5 in the forming plate 1 and into a bore in the forming table 6 which is aligned with bore 5.

The upper surface 2 of the forming plate 1 which is equipped with forming bowls 4 is intended for the portioning and rounding of the dough, whereas the smooth lower surface 9 is intended only for portioning of dough. Both processes, namely the forming and the portioning, take place using the forming plate 1 in the known bakery machine. For an explanation first of the use of a forming plate 1 for the portioning of dough, reference is particularly made to FIG. 2 of the drawings.

FIG. 2 shows the forming plate 1 which is fixed on the forming table 6 in its working position by means of the stop 7 and a retaining pin 8 which extends through the bore 5 and into a bore in the forming table 6 which is in alignment with bore 5. The forming plate 1 here rests on its upper surface 2 because of the purpose of its use.

Above the forming plate 1 and the forming table 6 are positioned the operational elements of the forming machine intended for carrying out the process of portioning of the dough, as will be described hereinafter. These elements comprise a dough-surrounding ring 10, a pressure plate 11 and a cutter array 12 which is movable relative to the pressure plate 11 and to the dough-surrounding ring 10 in the direction of arrow 13.

Both the forming table 6 as well as the system consisting of dough-surrounding ring 10, pressure plate 11 and cutter array 12 are fixed in a suitable manner which is not shown in the drawings to structural elements of the forming machine. Indeed, they are fixed in such a manner that the dough-surrounding ring 10, as well as pressure plate 11 and cutter array 12, are movable additionally as a complete operational unit in the direction of the arrow 13, in other words perpendicular to the plane of the forming plate 1. Moreover, the forming table 6 is displaceable in circular motion in the plane of the forming plate for carrying out a rounding process. Further reference will be made to this hereinafter.

In order to carry out a process of dough portioning, the forming plate 1 is first loaded with the dough to be handled as uniformly as possible on its working surface. Then the forming plate is fixed to the forming table 6.

Figure 4:
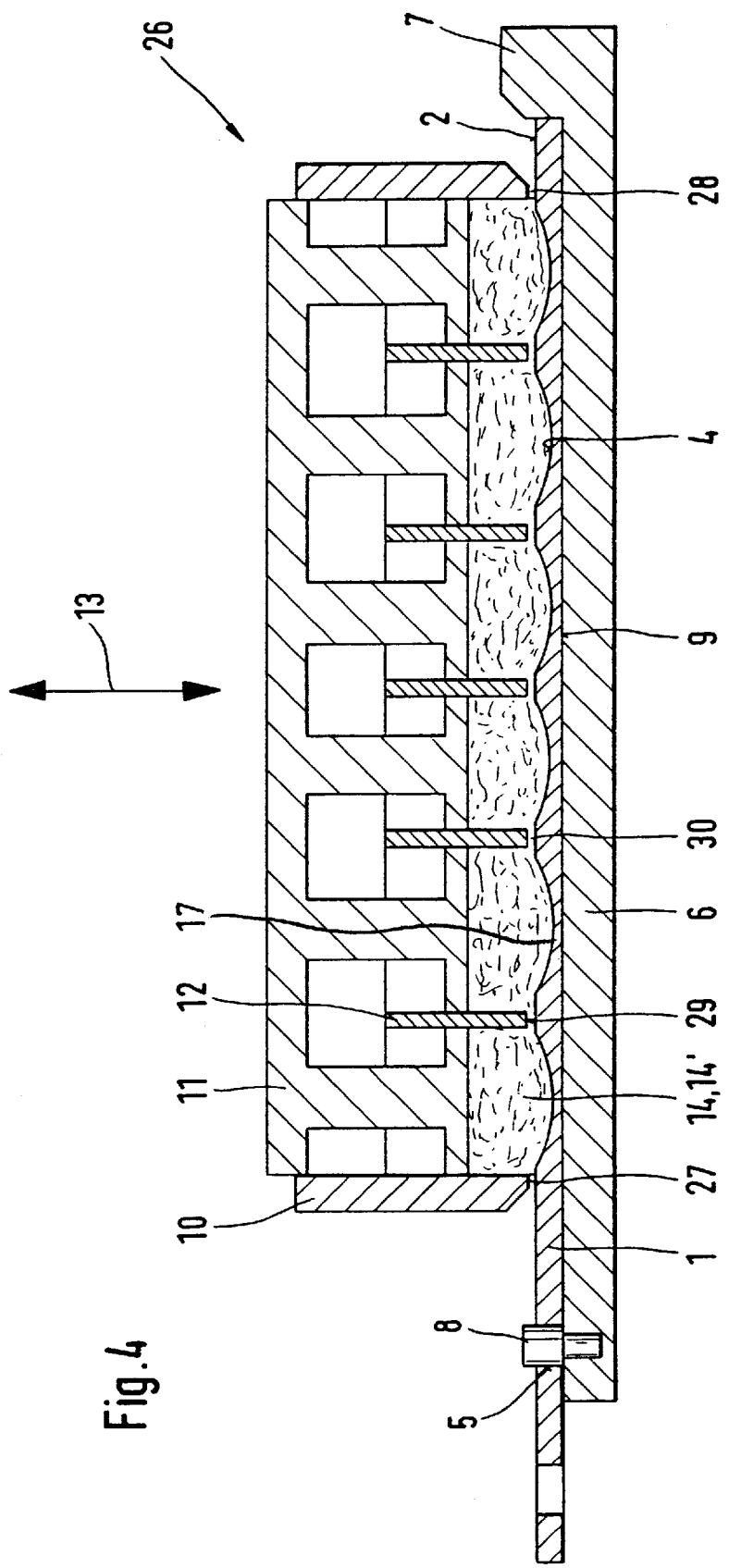
FIG. 4 is a view, partly in section, of a star knife dough portioning and forming machine with forming plate set in place, wherein the operational elements intended for the shaping and portioning of the dough are shown in the extended, active position.

Next, the system consisting of dough-surrounding ring 10 as well as pressure plate 11 and cutter array 12, which is shown in FIG. 2 in the withdrawn position, is displaced downwardly in the direction of the arrow 13 until there is a negligibly small annular gap between the bottom edge 15 of the dough-surrounding ring 10 and the facing surface of the forming plate 1 (see FIG. 4). In this phase of the operation, a pressure chamber is formed defined by the inside of the dough-surrounding ring 10, the pressure plate 11 and the forming plate 1. The dough 14 is initially uniformly pressed by means of the pressure plate 11 and is divided within the pressure chamber. The dough body is then separated into portions by the extension of the cutter array 12 from the pressure plate 11. The mass of the portions is dependent upon the portioning chambers formed by the cutter array 12. These portioning chambers all have the same size, so that, depending upon how the dough is deposited, dough portions each of the same mass are produced.

The described method of working assumes that there is a uniform filling of the pressure chamber with a view to achieving reproducible partial masses of the partial portions. Thus, one must ensure that on the one hand the total mass of the dough 14 is appropriately chosen and that this total mass is positioned in a reproducible manner on the working surface of the forming plate 1 before the beginning of the dough portioning process. An inaccurate placing of the dough, in the manner shown for example in FIG. 2, has the consequence that a dough piece 16 will be cut off by the dough-surrounding ring 10 in its descent towards the forming plate 1. Any dough has some limited flow capacity, so that even with an inaccurate placement of the dough on the working surface, this inaccuracy can be equalised by the pressure plate 11 and one can nevertheless achieve a uniform mass distribution in the aforesaid partial portions. Depending upon the absolute magnitude of the piece 16 which is cut off, the partial portions formed in this way will have however a smaller mass than that originally planned. The ability of the dough to flow is limited however, so that it is not possible in this way to compensate for all inaccurate placements.

The working surface area 17 of the upper surface 2 and the working surface area 17' of the lower surface 9 of the forming plate 1 are defined in accordance with the invention by the distribution of the forming bowls 4. In order to make the distribution of the forming bowls 4 visible, in particular from the lower surface 9, the forming plate 1 has a layered structure which permits the position of the forming bowls 4 and thus of the working surface area 17' to be seen when observing the lower surface side 9. In order to explain the layered structure, reference is now made to the illustration shown in FIG. 3 of the drawings.

Figure 3:
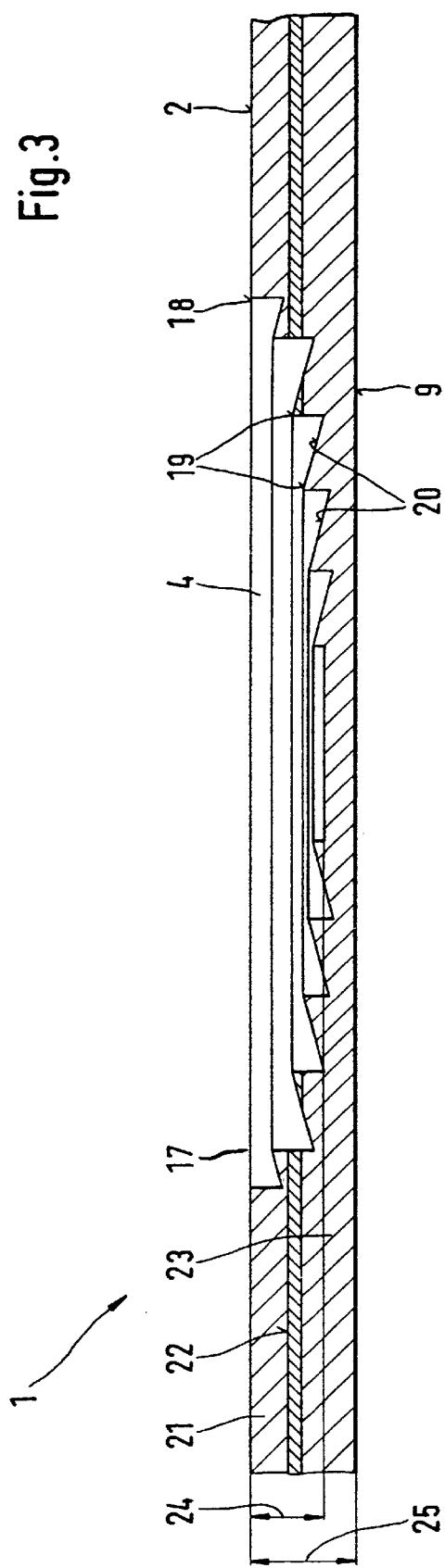
FIG. 3 is a partial sectional view of a forming plate taken along the line III—III in FIG. 1.

FIG. 3 shows the structure of one forming bowl 4. This has an overall circular shape and is characterised, starting from its outer margin 18, by an arrangement of concentric annular steps 19 which, starting from their step edges, form ramp-like annular step surfaces 20 extending downwards at an angle to the planes of the upper surface 2 as well as of the lower surface 9. The forming plate 1 is characterised, starting from its upper surface 2, by a sequence of three contiguous layers 21, 22, 23. The layers 21, 23 are optically translucent, while the layer 22 is optically opaque, i.e. is impermeable to light in the optical range. The optically impermeable layer 22 is located within a thickness zone 24 which, starting from the upper surface 2, corresponds to the maximum depth of a forming bowl 4. This can amount for example to 50% to 75% of the thickness 25 of the forming plate 1. Preferably, the opaque layer 22 is arranged in a region close to the upper surface 2.

This layered structure of the forming plate 1 has the result that in the event of it resting on a substrate with its lower surface 9 facing upwards, the distribution of the forming bowls 4 and—following on from this—the working surface area 17' can be unequivocally seen, so that the exact placement of the dough 14 is possible. This object is achieved without material changes, either to the upper surface 2 or to the lower surface 9, so that by this marking no effect whatsoever on the dough 14 to be treated is to be expected. The markings carrier, namely the aforesaid opaque layer, is incorporated into the layered structure of the forming plate and, in terms of its marking qualities, undergoes no long-term changes whatsoever which would adversely affect its intended purpose.

The layers 21 and 23 can comprise, for example translucent PVC, PE, PP or the like, conventionally used for forming plates 1. In contrast for the opaque layer, there is used a layer which is of comparable material but impermeable to light. In order to manufacture such a forming plate, the aforesaid layers 21 to 23 can be connected to one another, depending upon the desired thickness, in a hot pressing process, as a result of which the layers are welded together. The opaque layer can have a thickness of, for example, 0.5 mm and can be connected on both sides to the boundary layers 21, 23 by way of films which are at least translucent.

After the layer structure has been made in this way, the forming bowls 4 can be made in the region of the upper working surface 17 by a localised removal of material.

The forming plate 1 in accordance with the invention thus constitutes a working tool which makes possible a special shaping with a view to achieving equal size portions in the same dough portioning processes, and provides an improved optical visibility of the underside working surface 17'.

As an alternative to the aforesaid embodiment of the forming plate 1, marking elements on the working surface could be prepared based on local differences in light permeability. The base member of the forming plate is preferably made in one piece from a plastics material which optically is at least translucent, so that with the upper surface in contact with a forming table, particularly in combination with a contrasting color substrate, the distribution of the forming bowls 4 is equally visible.

As already mentioned above, the forming table 6 is displaceable within its plane in defined circular movements, to be described in more detail hereinafter, in order to carry out a rounding process. Both the forming table 6 and also the operational unit 26 comprising the dough-surrounding ring 10, the pressure plate 11 and the cutter array 12 are connected to the frame structure of a bakery machine in a manner which is not shown in the drawings. For movement of the aforesaid operational unit 26, the movement of the cutter array 12 relative to the pressure plate 11, and the circular movements of the forming plate, a respective drive means is associated with each component.

The marking elements which peripherally define the working surface areas 17, 17' both on the upper side 2 and also on the underside 9 are represented by the forming bowls 4 consistent with one embodiment of the invention described above. These working surface areas are arranged to be of the same size and in register with one another.

Figure 5:
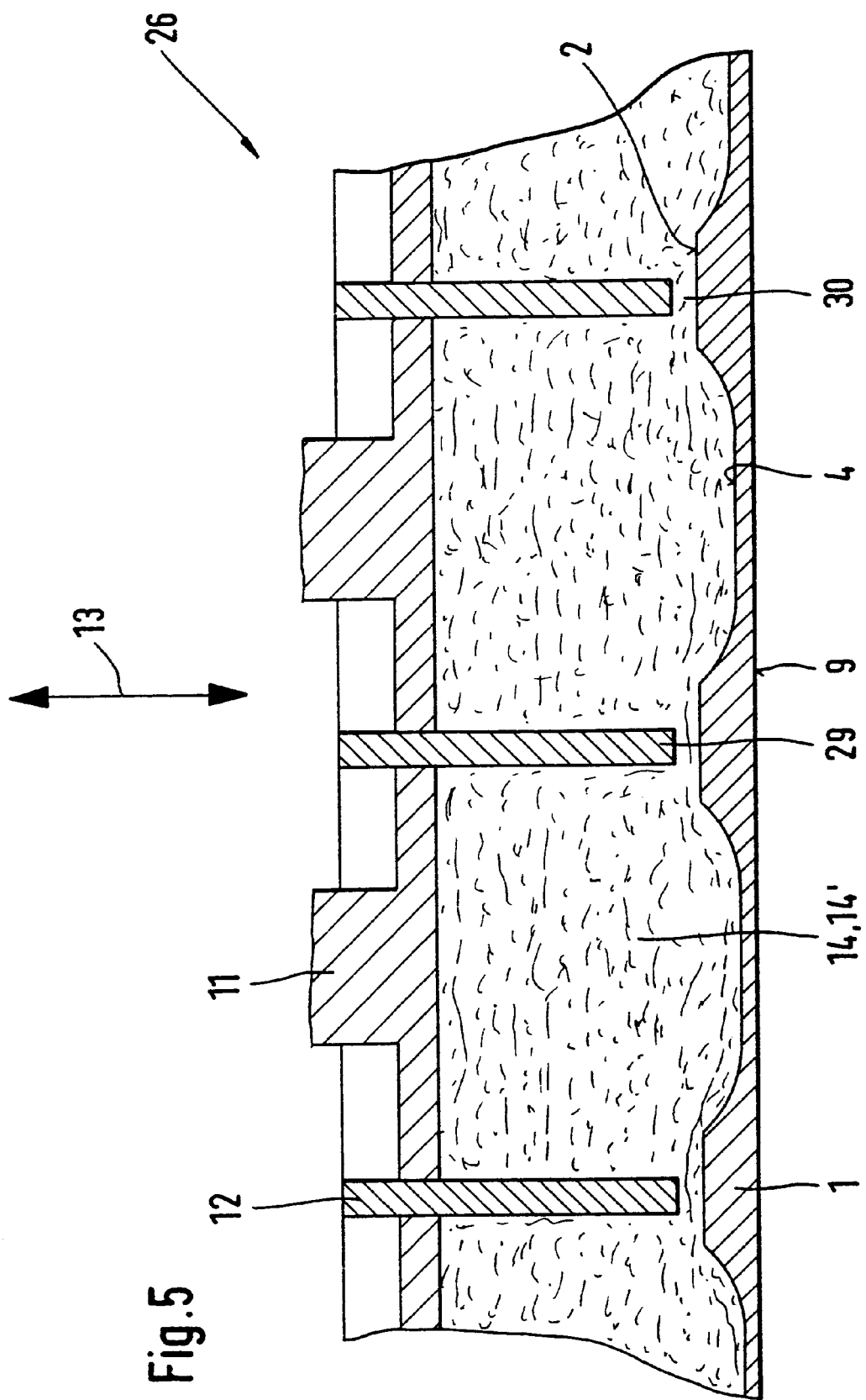
FIG. 5 is a partial view, on an enlarged scale, of the star knife dough portioning and forming machine of FIG. 4.

In order to carry out a dough portioning and rounding process, the operational unit 26 is first located in the retracted starting position shown in FIG. 2, i.e. remote from the forming plate 1 and the forming table 6. The forming plate 1, laden with a defined mass of dough within its working surface area, is placed on the forming table 2 in the orientation shown in FIGS. 4 and 5, and is fixed to the table.

Next, the operational unit 26 is displaced downwards in the direction of the arrow 13 towards the forming plate 1, and indeed until there remains only a very small air gap 28 between the circumferential lower ring edge 27 of the dough-surrounding ring 10 and the upper surface of the forming plate 1 which faces it. In this working phase the cutter array 12 is located initially in a retracted position within the structure of the pressure plate 11. Between the pressure plate 11, the internal walls of the dough-surrounding ring 10 and the forming plate 1 there is now a substantially cylindrical pressure chamber, within which the dough 14 is uniformly distributed. A uniform distribution of the dough mass within this pressure chamber is achieved by means of the pressure plate 11 which is displaceable relative to the dough-surrounding ring 10 in the direction of the arrow 13.

Next, the cutter array 12 is extended from the pressure plate 11 in the direction towards the forming plate 1, and again such that only very small air gaps 30 remain between the bottom edges 29 of the individual knife elements and the facing surface of the forming plate 1.

By means of the extension of the cutter array 12, the dough 14 is now divided into portions 14'. At the conclusion of this dough portioning process the forming table 6 and—associated therewith—the forming plate 1 are set into circular motion within the plane of the forming plate. During this circular motion the cutter array 12 remains in the extended position shown in FIGS. 4 and 5. Because of the upper surface shape of the forming bowls 4, which will be described in more detail hereinafter, an entraining effect is exerted on each of the individual portions 14' by the circular motion. The circular motion results in a rolling of the portions 14' against the walls of the cutter elements which causes the dough skin at the cut areas in the region of the cutter elements to be drawn in towards the inside. As a result of the rolling of the portions 14' against the walls of the cutter elements and the walls of dough-surrounding ring in the course of carrying out this process on the portions 14', ball-like products which can be taken on for further treatment are created. After the conclusion of the rounding process and after retraction of the operational unit 26 away from the forming plate in the direction of the arrow 13, these products are removed from the forming plate 1 for a further treatment.

In addition to the formation of the shaped products, the rounding process also has the consequence of tearing off parts of the portions 14' in the region of the air gaps 30. It is important in connection with this that the air gaps 30 should not be too big, because that would make it difficult to pull away the dough portions 14', particularly from the portioning chambers lying radially inwardly.

Figure 6:
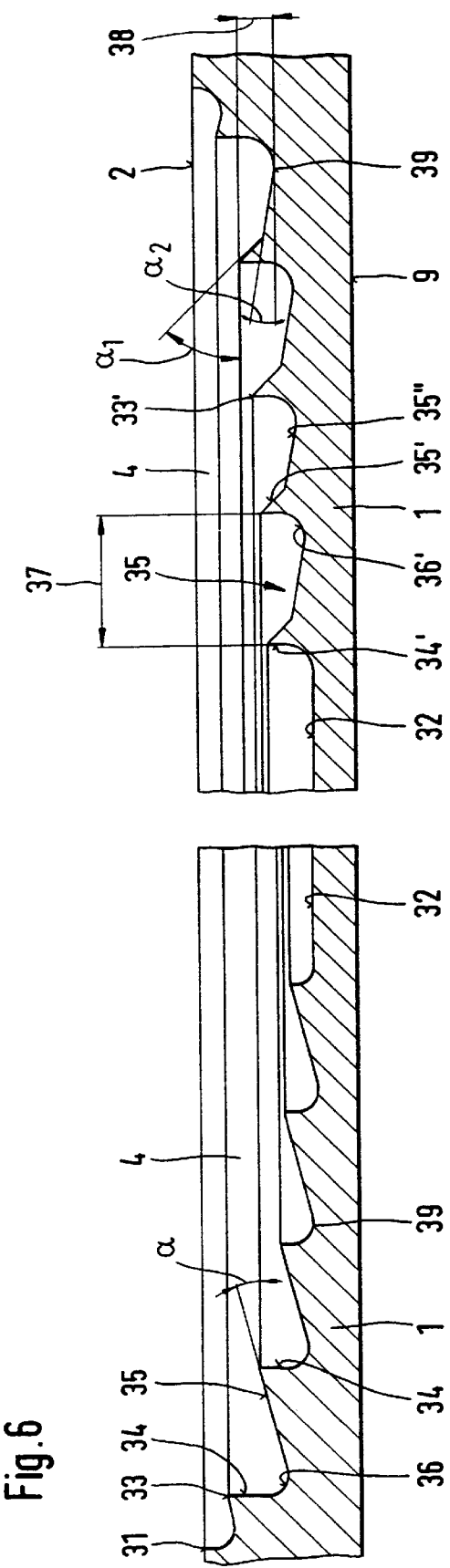
FIG. 6 is a split representation illustrating a conventional forming bowl (shown on the left) and a forming bowl in accordance with the invention (shown on the right), in a forming plate, in vertical section.
Figure 7:
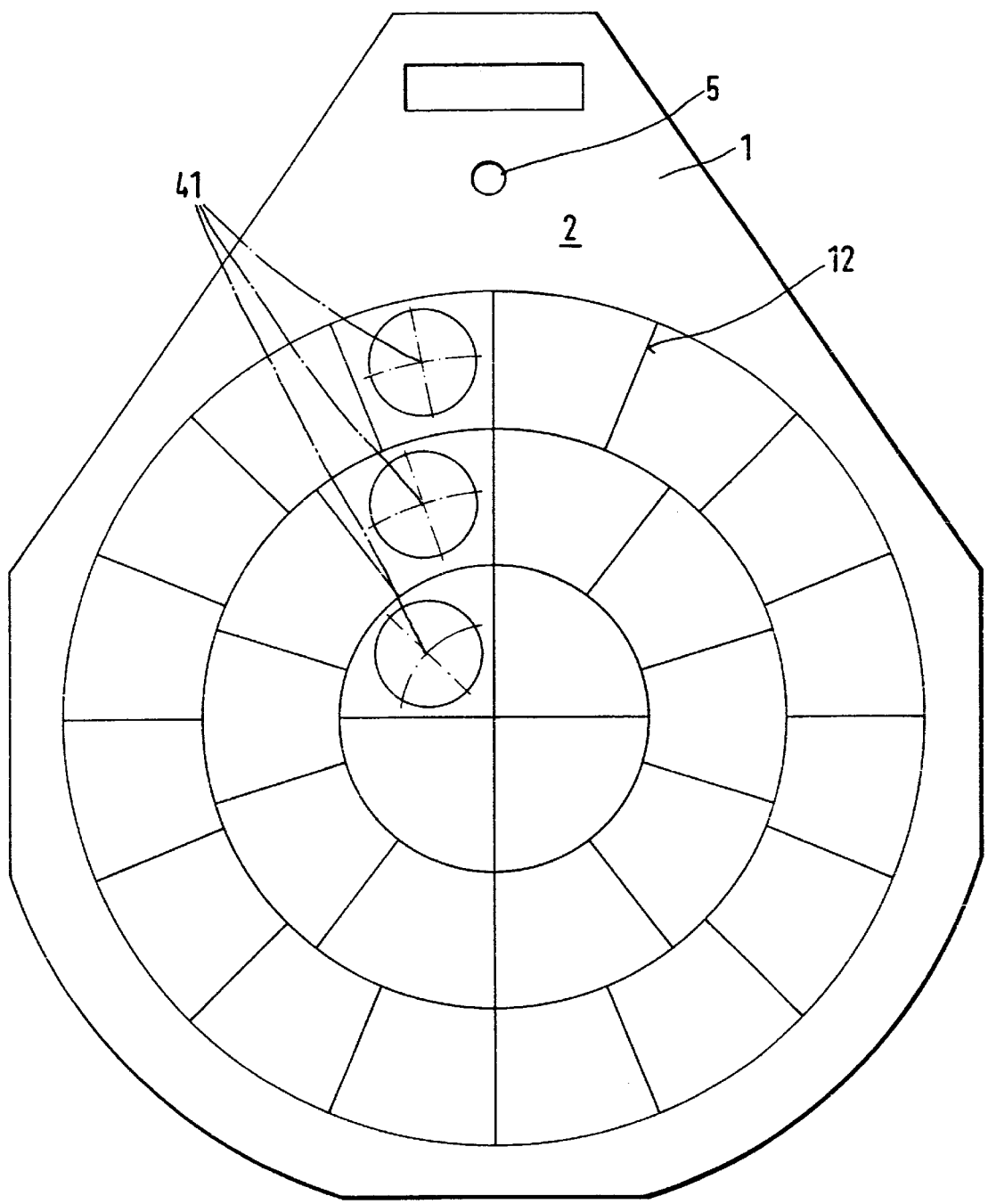
FIG. 7 is a schematic representation, in plan view, of the cutter array associated with the working surface area of a forming plate.
Figure 8:
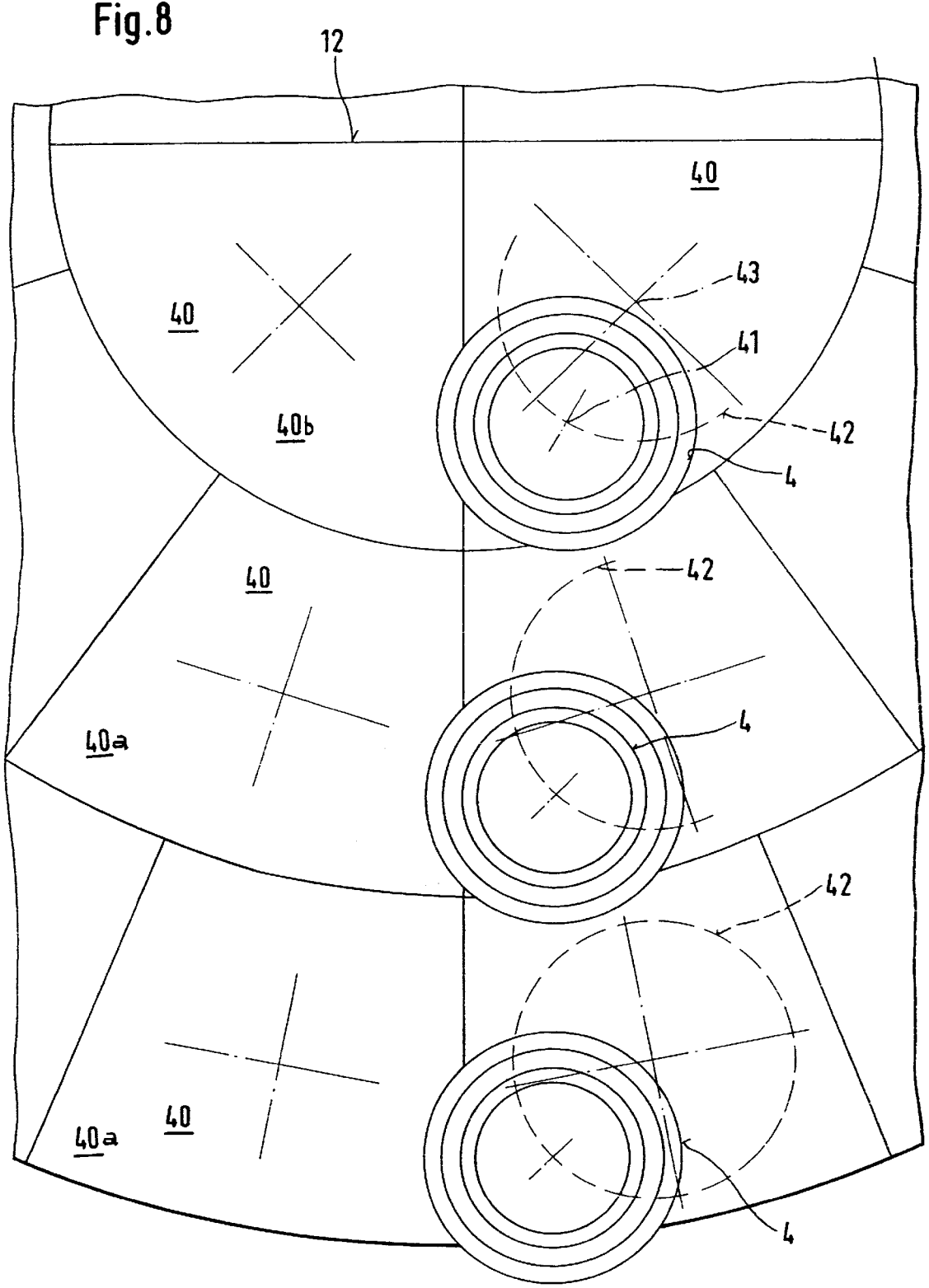
FIG. 8 is a partial view, on an enlarged scale, of the cutter array shown in FIG. 7.

In FIGS. 6 to 8 are shown functional elements which correspond to those of FIGS. 1 to 5, and which are correspondingly numbered, so that it is not necessary to repeat the description of these elements.

The left-hand half of FIG. 6 shows the profile of a forming bowl 4 according to the prior art. This is characterised by an arrangement of concentric annular edges 33 starting from the outside 31 towards a center 32 where the bottom of the forming bowl is located. These annular edges 33 follow one another stepwise from the outside 31 and are continued as far as the bottom of the forming bowl.

On the side of each annular edge 33 facing towards the center 32 there is an annular flank 34 extending perpendicular to the underside 9. On the side of the annular edge 33 which is radially opposite to the annular flank 34 there is a ramp surface 35 extending at an angle α to the underside 9. Depending upon the magnitude of this angle α, the ramp surface 35 falls away towards the underside 9 in the direction which is orientated away from the center 32. The ramp surface 35 goes through an intermediate transition zone 36 which is rounded at the bottom of the ramp in transition to the next annular flank 34.

It is essential for this known surface shaping of the forming bowl 4 that there is the constant angle of inclination α between the annular edges 33 and that there is the transition zone 36.

By providing a rounded transition zone 36 between the annular flank 34 and the ramp surface 35 the intention is to prevent dough from sticking at the bottom 39 of the ramp. However, a result of this shaping of the surface profile is that there is a reduced entraining effect which the forming bowl can exert on the dough portion 14'. This is particularly noticeable when working with relatively dry kneaded dough, and, due to the relatively obtuse angle between the annular flank 34 and the ramp surface 35, the profile can penetrate only incompletely into the substance of the dough mass to be shaped, so that the result of the rounding process is unsatisfactory.

In accordance with the invention, and as is shown in the right-hand half of FIG. 6 of the drawings, the profile of the forming bowl 4 is modified in such a manner that the ramp surface 35 is divided into two sections, namely a first section 35' which follows directly on from the annular edge 33' and which extends downwards at an angle $α_1$, to the underside 9, and a second section 35" which follows on from the first section and extends at an angle $α_2$ to the underside 9. Since the angle $α_1$, is greater than the angle $α_2$, for example, three times the size, there results, for a given radial pitch distance 37 between two annular edges 33', a corresponding raising 38 of the annular edge 33' above the flank base 39 associated therewith. This flank base 39 is again characterised by a rounded section 36' which merges into the next annular flank 34' which extends perpendicular to or at least approximately perpendicular to the underside 9 of the forming plate 1.

By this design one achieves the result that the annular edges 33' are raised substantially higher in relation to the flank base 39 in comparison with the illustrated prior art. As a result of the sharper, cutting-type angle which the ramp surface section 35' makes with the annular flank 34', there is an improved capacity for penetration of the profile, even into comparatively dry types of dough and, associated with this, a considerably improved entraining effect. Because of the fact that the ramp surface section 35", which is adjacent to the flank base 39, extends at a comparatively shallow or acute angle relative to the underside 9, one has a comparatively wide aperture profile between two successive annular flanks 34', which in combination with the rounded shape of the transition zone 36' does not in practice allow the remaining dough to stick.

As is shown in FIGS. 7 and 8, cells 40 are defined by the cutter elements of the cutter array 12. In particular, these cells are bounded at the sides, designed such that each should receive the same portioned volume. Because the boundaries of the cells are formed in part by radial wall elements and in part by peripheral cylindrical wall elements, the radially outermost cells 40a have an approximately quadrilateral basic shape and the radially innermost cells 40b have an approximately triangular basic shape.

As explained above, a circular movement of the forming plate 1 is carried out for the rounding and shaping process. In relation to the individual cells 40, this movement represents a movement of the center point 41 of a forming bowl 4 along a circle 42 about a central point 43 which corresponds essentially to the center point of the bottom surface of the cell. The radius of the aforesaid circle 42 is dimensioned in comparison to the surface area extent of the cell 40 so that by this circular movement of the forming bowl the whole bottom zone of the cell is uniformly covered, so that a correspondingly uniform entrainment effect is exerted on the portion of the dough located in the cell 40.

However, because the radius of the aforesaid circle 42 is the same for the whole forming plate, and the geometry of the surface areas of the radially outer cells differs significantly from that of the radially inner cells, and the forming bowls are the same size, there are differences in the entraining effect between the radially outer cells 40a and the radially inner cells 40b, so that different working results arise for the same working time on the dough.

FIG. 8 illustrates this state of affairs. It can be seen here that the forming bowl circulating around the circle 42 of the radially inner cell 40b generally does not encounter the corner regions of the bottom surface of this cell 40b, while for the radially outermost cell 40a, it is possible for the forming bowl 4 to encounter the corner regions without any problem.

This has an effect on the rounding process and pertains to the time needed for the shaping of a ball-like product. If a corner region of a cell is not swept or is only insufficiently swept, more time is required, depending upon the consistency of the dough—to reach the dough portions located in the corner regions of the cells 40 and to bind them into the rounded product.

In order to achieve an at least approximately, qualitatively identical working result for all cells of a cutter array 12, in spite of the geometrical and kinematic inequalities of the forming process, the forming bowls according to the invention are shaped differently according to their radial disposition.

This can be effected, with identical forming bowl diameters and forming bowl volumes over the forming plate 1, if the annular edges 33' of the radially inner forming bowls, by appropriate dimensioning of the angles $α_1$, $α_2$, have a greater height 38 above the respective flank bases 39, so that in this region a correspondingly stronger entraining effect can be exerted on the dough. Correspondingly, the angles $α_1$ and $\alpha_2$ of the radially outer forming bowls are dimensioned for given pitch distances 37 so that the values of the heights 38 decrease relatively more slowly, the annular edge profile formed by the annular edges 33' is shallower and a smaller entraining effect is developed correspondingly relative to the radially inner forming bowls.

Alternatively, if one wants to have the same forming bowl volume for all forming bowls, the forming bowl diameter for the radially inner forming bowls can be made larger than for the radially outer forming bowls. In this way, one has relatively larger, but shallow forming bowls in the radially inner areas and relatively smaller but deeper forming bowls in the radially outer areas. By means of this dimensioning of the forming bowls one can likewise achieve comparability of the entraining effect between the radially inner and radially outer forming bowls. With identical dough masses within the individual cells, one can in this way produce shaped products of the same quality in spite of different geometrical conditions.

What is claimed is:

1. A forming plate for handling dough in a dough portioning and forming machine, said forming plate comprising:
 a substantially flat base member, at least a portion of which is optically translucent, said base member having an upper and a lower surface, said upper surface having a plurality of forming bowls of a predetermined depth formed therein and defining an upper working surface area for the handling of the dough, said lower surface being substantially smooth and having a lower working surface area for the handling of the dough of substantially the same size as and located in registration with said upper working surface area;
 optical marking elements, visible upon viewing at least said lower surface, and delineating the position and size of said working surface areas, said optical marking elements being visible due to localized differences in light permeability of said base member.

2. A forming plate according to claim 1, wherein said base member is formed of a plurality of contiguous layers comprising at least an optically opaque inner layer sandwiched between two optically translucent outer layers, said optical marking elements being positioned on said opaque inner layer.

3. A forming plate according to claim 2, wherein said opaque inner layer is arranged within a thickness zone of substantially the same depth as said forming bowls.

4. A forming plate according to claim 2, wherein said layers comprise thermoplastic material and are welded together by a hot pressing process.

5. A forming plate according to claim 1, wherein at least one of said forming bowls comprises a recess in said base member formed by removing material therefrom.

6. A forming plate according to claim 1, further comprising a plurality of grooves positioned in at least one of said working surface areas.

7. A forming plate according to claim 1, wherein said base member comprises a single piece of optically translucent plastic material.

8. A forming plate for handling dough in a dough portioning and forming machine, said forming plate comprising:
 a base member having an upper and a lower surface, said upper surface having a plurality of forming bowls of a predetermined depth formed therein and defining an upper working surface area for shaping and portioning of said dough, at least one of said forming bowls comprising a plurality of annular edges arranged concentrically with one another, one of said edges defining an outer perimeter of said bowl and another of said edges defining a central bottom thereof, each of said edges comprising an annular flank extending substantially perpendicularly to the upper surface of said base member, a plurality of ramp surfaces being positioned between each of said edges, a plurality of flank bases, each one being positioned to join one of said annular flanks to one of said ramp surfaces, at least one of said ramp surfaces having an angle of inclination sloping downwardly toward said outer perimeter.

9. A forming plate according to claim 8, wherein said one ramp surface further comprises a region positioned adjacent to an annular edge and having an angle of inclination which slopes upwardly and supports said adjacent annular edge at a predetermined height above said ramp surface, said annular edge and said annular flank defining a knife-like profile.

10. A forming plate according to claim 9, wherein at least one of said ramp surfaces comprises two adjacent ramp sections positioned between said flank base and said annular edge, each of said ramp sections having a constant angle of inclination and being dimensioned so that said angle of inclination of said ramp section adjacent to said annular edge is greater than the angle of inclination of said ramp section adjacent to said flank base.

11. A forming plate according to claim 8, wherein said angle of inclination of said ramp surface has a steadily increasing value between said flank base up to said annular edge.

12. A forming plate according to claim 8 wherein said forming bowls are substantially round and arranged within a circle about the center of said upper working surface, each of said bowls having the same volume, said bowls positioned closer to the center of said upper working surface having diameters relatively greater than the diameters of said bowls positioned farther from the center of said upper working surface.

13. A forming plate according to claim 8, wherein said forming bowls are substantially round and arranged within a circle about the center of said upper working surface, each of said bowls having the same volume and diameter, said bowls positioned closer to the center of said upper working surface having ramp surfaces with relatively greater angles of inclination than the angle of inclination of ramp surfaces in bowls positioned farther from the center of said upper working surface, and said annular edges of said bowls positioned closer to said center of said upper working surface being relatively higher than said annular edges of said bowls positioned farther from said center.

14. A forming plate according to claim 8, wherein the slope of the angle of inclination of all of said ramp surfaces for one of said forming bowls is the same.

15. A forming plate according to claim 8, wherein the slope of the angle of inclination of all of said ramp surfaces of all of said bowls is the same.

* * * * *